US008736988B2

(12) United States Patent
Cheng et al.

(10) Patent No.: US 8,736,988 B2
(45) Date of Patent: May 27, 2014

(54) COMPACT IMAGING DEVICE

(75) Inventors: Kwok Sing Cheng, Tuen Mun (HK);
Chuen Kuen Yeung, Ma On Shan (HK)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 0 days.

(21) Appl. No.: 13/553,724

(22) Filed: Jul. 19, 2012

(65) Prior Publication Data

US 2014/0022655 A1    Jan. 23, 2014

(51) Int. Cl.
*G02B 26/08* (2006.01)
*G02B 7/182* (2006.01)
*G02B 6/44* (2006.01)
*H02K 41/035* (2006.01)

(52) U.S. Cl.
CPC .......... *G02B 26/085* (2013.01); *G02B 7/1828* (2013.01); *H02K 41/0356* (2013.01); *G02B 6/4457* (2013.01); *G02B 6/4458* (2013.01)
USPC ........... 359/824; 359/694; 359/819; 359/826; 359/698

(58) Field of Classification Search
CPC ....... H02K 1/145; H02K 1/146; H02K 1/165; G02B 6/4457; G02B 6/4458
USPC ................ 359/819–826, 694–698; 310/12.16
See application file for complete search history.

(56) References Cited

U.S. PATENT DOCUMENTS

| | | | |
|---|---|---|---|
| 7,285,879 B2 | 10/2007 | Osaka | |
| 7,291,942 B2 | 11/2007 | Osaka | |
| 7,468,851 B2 * | 12/2008 | Uno et al. | 359/824 |
| 7,649,703 B2 | 1/2010 | Shiraki et al. | |
| 8,164,842 B2 * | 4/2012 | Shiraki et al. | 359/824 |
| 2006/0275032 A1 | 12/2006 | Hong et al. | |
| 2010/0060999 A1 | 3/2010 | Higuchi | |
| 2010/0232161 A1 * | 9/2010 | Aschwanden et al. | 362/278 |
| 2011/0103782 A1 * | 5/2011 | Tsuruta et al. | 396/55 |
| 2011/0199694 A1 * | 8/2011 | Kimoto | 359/822 |

* cited by examiner

*Primary Examiner* — Ricky Mack
*Assistant Examiner* — Daniele Manikeu
(74) *Attorney, Agent, or Firm* — Berkeley Law & Technology Group, LLP

(57) ABSTRACT

The subject matter disclosed herein relates to an imaging device including an epoxy reservoir and a number of features to facilitate alignment of components during assembly of the imaging device.

18 Claims, 14 Drawing Sheets

COMPACT IMAGING DEVICE

FIELD

The subject matter disclosed herein relates to an imaging device including an actuator to adjust a position of a lens assembly along an optical axis.

BACKGROUND

Many portable electronic apparatuses, such as a cellular phone and/or a personal digital assistant (PDA) for example, may comprise a compact camera module. Such a module may comprise an image sensor, an imaging lens assembly, and/or an actuator to adjust the position of the imaging lens assembly with respect to the image sensor. As designers push towards slimmer, smaller, and/or lighter portable electronic apparatuses, compact camera module manufacturers, among others, are facing a challenge of providing smaller compact camera modules that can fit into limited space of the apparatuses while maintaining desirable mechanical tolerances. In addition, a push towards increasingly lower manufacturing costs persists for compact camera modules having ever-increasing performance.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

Figure 1A:
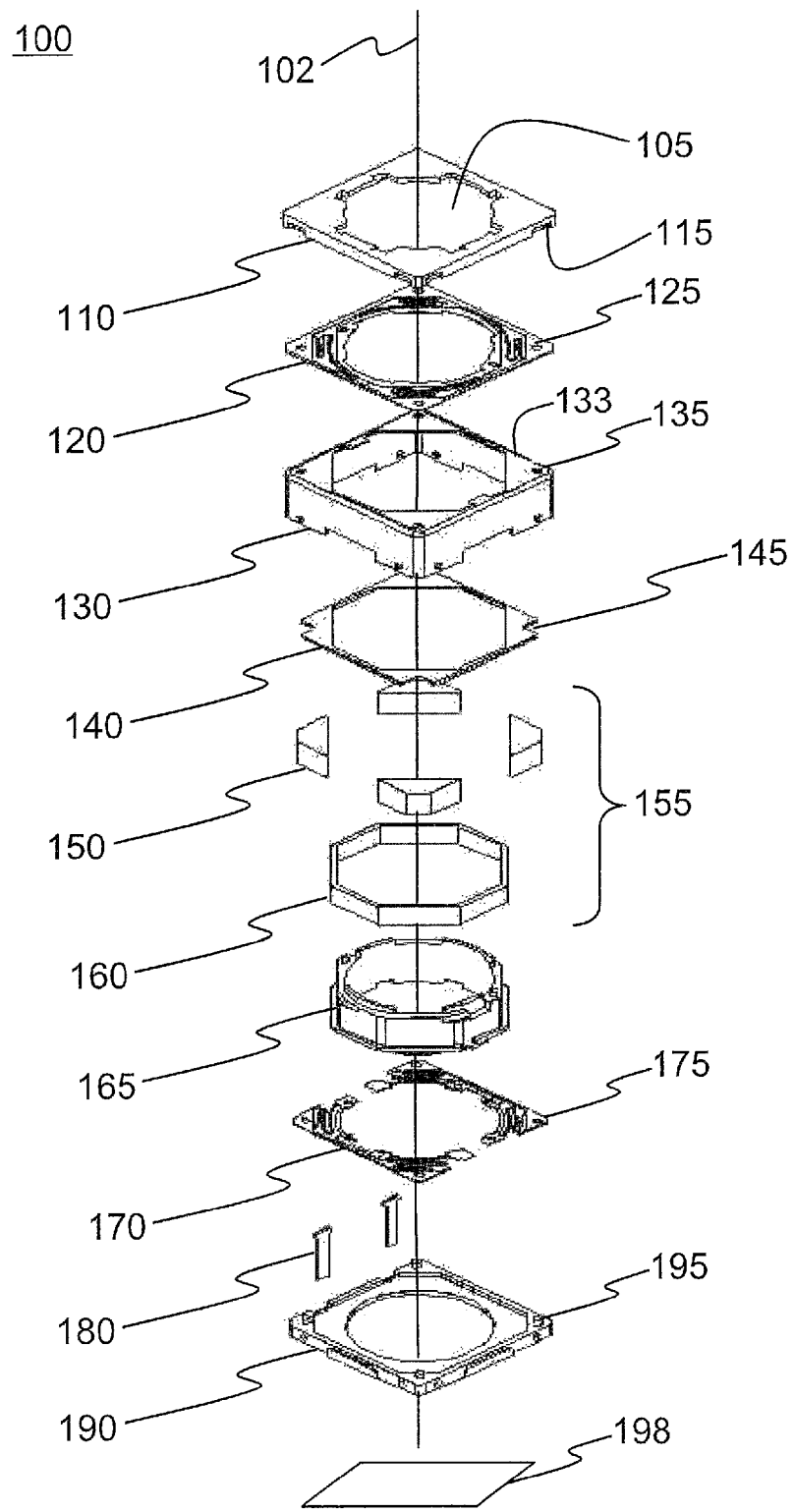
FIGS. 1A and 1B are exploded perspective views of a compact imaging module, according to an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

As used to describe embodiments herein, terms "above", "below", "upper", "lower", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on.

Embodiments described herein include a compact imaging module that provides a mechanism and/or allows a process to adjust a distance between an imaging lens and an image sensor. As described in detail below, particular features of a compact imaging module may provide an advantage to designers incorporating such a module into increasingly slimmer, smaller, and/or lighter portable electronic apparatuses, such as a compact camera, for example. For example, particular features of a compact imaging module may allow for a relatively high precision assembly of components of the module, a relatively small tilting angle of an optical axis of the module, and relatively low cost of assembling or manufacturing the module, just to name a few examples.

As mentioned above, a compact imaging module, such as a compact camera module, may provide auto-focus and/or other imaging functions by selectively adjusting a distance between an imaging lens and an image sensor using a lens driving apparatus, for example. In an example, a compact imaging module may be mounted in a host structure, such as a camera body or a mobile phone body. Accordingly, such a compact imaging module may comprise components that are either moveable with respect to a host structure or are fixed relative to the host structure. In an example implementation, moving components may include a lens holder and an actuator coil, whereas fixed components may include cases, an outer cover (e.g., a yoke), one or more magnets, an adhesive isolator, and electrical connectors, as described below. In some embodiments, such an outer cover may comprise a yoke. In other embodiments, the outer cover may comprise non-magnetic material. Accordingly, an outer cover may comprise a yoke, a metal cover, or a non-magnetic cover. One or more springs or other elastic elements may be attached to moving and fixed components to provide a restoring force to motion imparted by an actuator, for example.

In a particular embodiment, a compact imaging module may comprise a lens holder to hold one or more lenses and an actuator to adjust a position of the lens holder along an optical axis. Such an actuator may include magnets and at least one coil to produce an electromagnetic force. A compact imaging module may further comprise an outer cover having a top portion that includes a set of alignment holes to receive pins protruding from a top case. A top elastic element (e.g., a spring such as a leaf spring or a planar spring) may be between the top case and the outer cover. The top elastic element may also include a set of alignment holes to receive the pins protruding from the top case. The top elastic element may comprise a first portion that moves with at least one coil, and a second portion fixed to a non-moving structure such as top case. For example, the first portion of the top elastic element may be attached to the lens holder, whereas the second portion of the top elastic element may be attached to the top case and sandwiched between the top case and outer cover. An adhesive isolator may be between the top portion of the outer cover and the magnets. The adhesive isolator may include notched regions to receive an adhesive to adhere the outer cover to the pins protruding from the top case. The outer cover may include an adhesive reservoir (e.g., 138 in FIG. 1C) corresponding to such notched regions to receive the adhesive. Accordingly, such notched regions may correspond to sets of alignment holes in the top elastic element and the outer cover.

A compact imaging module may further comprise a bottom elastic element between a bottom case and the lens holder. The bottom elastic element may include a set of alignment holes to receive pins protruding from the bottom case. The bottom case may include one or more slots to receive a portion of an electrically conductive connector comprising a top large portion and a bottom smaller portion that contacts the bottom elastic element. For example, an electrically conductive connector may comprise an L-shape connector or a T-shape connector. In a particular embodiment, the outer cover may comprise one or more protrusions directed substantially toward an optical axis of the compact imaging module. Such protrusions may correspond to and mate with a notched portion of the lens holder to resist rotation of the lens holder about the optical axis. Such correspondence may also resist lateral displacement of the lens holder perpendicular to the optical axis. In another embodiment, the lens holder may comprise one or more protrusions. Such protrusions may correspond to and mate with a notched portion of the outer cover. Further, as described in detail below, the lens holder may comprise a buffer area to allow displacement of spring arms of the top elastic element to avoid a collision between the spring arms and the lens holder if the lens holder moves.

In particular implementations, spring arms of the top elastic element may be positioned clockwise while spring arms of the bottom elastic element may be positioned counter-clockwise. In other particular implementations, spring arms of the top elastic element may be positioned counter-clockwise while spring arms of the bottom elastic element may be positioned clockwise. Such relative configurations of the top and bottom elastic elements may allow for improved rotational stiffness (e.g., to resist rotation of a lens holder about an optical axis) to provide improved stability of lens holder motion. For example, such improved lens holder stability may reduce a tilting angle of an optical axis of lenses included in a lens holder, which may allow for improved quality of images produced, at least in part, by a compact imaging module.

In a particular implementation, as described in detail below, a combination of top and bottom elastic elements may be configured to physically support a weight W of moving parts such as a coil, lens, and a lens holder, wherein such a combination has a spring constant k to satisfy the relationship k×1.0 mm>=20.0×W (In other words, the k-constant multiplied by 1.0 millimeters is equal to or greater than 20.0 times a weight of loading). Here, k has units of gram-force per millimeter, and W has units of gram-force. In another particular implementation, top and bottom elastic elements may be separated by a distance greater than about 1.8 millimeters.

In another particular embodiment, a compact imaging module may comprise a lens holder to hold one or more lenses and an actuator to adjust a position of the lens holder along an optical axis. Such an actuator may include magnets, a first coil, and a second coil to produce an electromagnetic force. The first coil may be adjacent to the magnets and the second coil may be below the magnets, for example. Individual magnets may include a protrusion to align the second coil in a particular orientation with respect to the optical axis. A compact imaging module may further comprise a segmented outer cover including notched regions to receive an adhesive and to provide viewing windows for observing alignment of the magnets in the segmented outer cover. In one implementation, such a segmented outer cover may comprise an assembly of a two-dimensional outer cover base, two-dimensional outer cover arms, and two-dimensional outer cover teeth. The magnets may be placed in a space formed, at least in part, by the two-dimensional outer cover arms and the two-dimensional outer cover teeth, for example.

The compact imaging module may further comprise a top elastic element between a top case and the segmented outer cover. In a particular implementation, the top elastic element may comprise a first portion that is movable with respect to the at least one coil, and a second portion that is fixed with respect to said at least one coil. The first portion of the top elastic element may be attached to the lens holder, whereas the second portion of the top elastic element may be attached to the top case and sandwiched between the top case and the segmented outer cover. Of course, such details of a compact imaging module are merely examples, and claimed subject matter is not so limited.

Figure 1B:
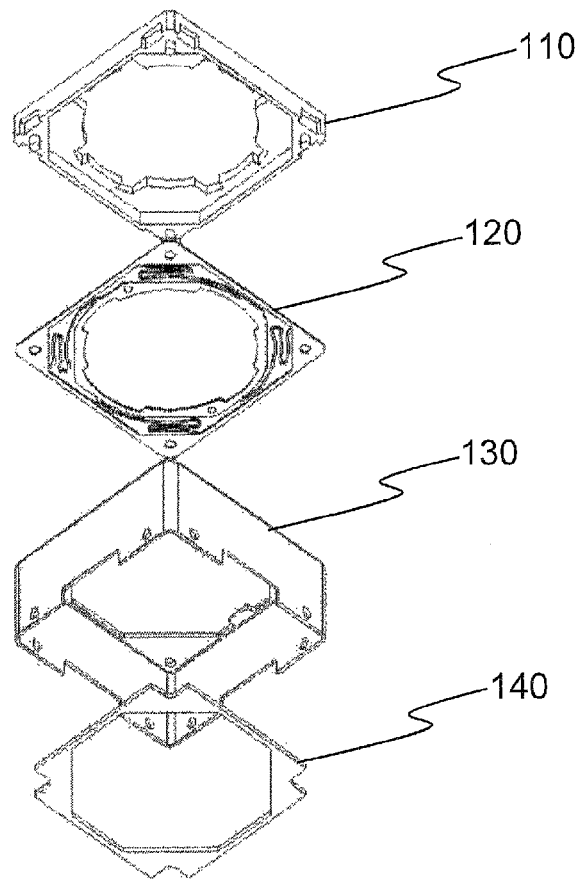
Figure 1C:
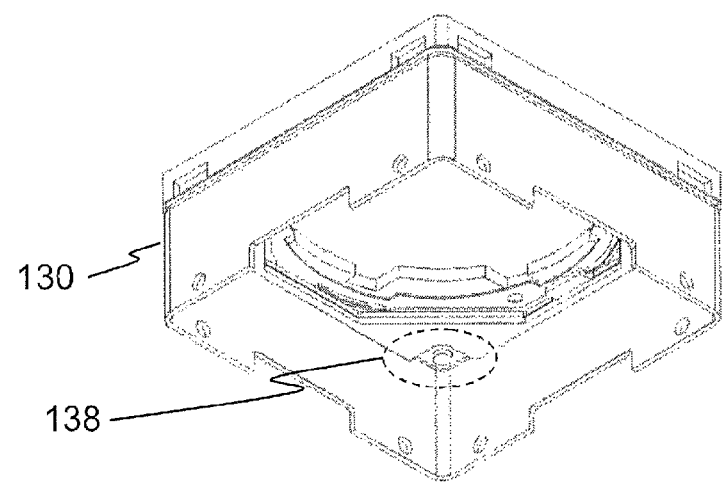
FIG. 1C is a perspective view of an outer cover of a compact imaging module, according to an embodiment.

FIG. 1A is an exploded perspective view of a compact imaging module 100 and FIG. 1B is an exploded perspective view of a portion of the compact imaging module, according to an embodiment. Such an imaging module may comprise an image sensor 198 including an active region of an array of pixilated charge-coupled devices (CCD) or one or more complementary metal-oxide-semiconductor (CMOS) devices, just to name a couple of examples. Imaging module 100 may further comprise a lens holder 165 to hold one or more lenses (not shown) and an actuator 155 to adjust a position of the lens holder along an optical axis. For example, such lenses may project an image onto an active region of image sensor 198. Aperture 105 may receive light into lens holder 165. Such an image need not comprise visible wavelengths, but may also comprise infrared and/or ultraviolet wavelengths, for example. So that such an image may be focused onto an active region of image sensor 198, actuator 155 may adjust a position of a lens assembly with respect to image sensor 198. In a particular implementation, actuator 155 may adjust a vertical position of lens holder 165 with respect to image sensor 198. Actuator 155 may include magnets 150 and at least one coil 160 to produce an electromagnetic force. A compact imaging module may further comprise an outer cover 130 having a top portion 133 that includes a set of alignment holes 135 to receive pins 115 protruding from a top case 110. Such a set of alignment holes may be in corner regions of top portion 133, though claimed subject matter is not so limited. A top elastic element 120 may be between top case 110 and outer cover 130. Top elastic element 120 may also include a set of alignment holes 125 to receive pins 115 protruding from top case 110. Such a set of alignment holes may be in corner regions of top elastic element 120, for example. An adhesive isolator 140 may be between top portion 133 of outer cover 130 and magnets 150. Adhesive isolator 140 may include notched regions 145 to receive an adhesive to adhere outer cover 130 to pins 115 protruding from top case 115. As shown in FIG. 1C, outer cover 130 may include an adhesive reservoir 138 corresponding to such notched regions to receive the adhesive. Such notched regions may be in corner regions of adhesive isolator 140, for example. Accordingly, notched regions 145 may correspond to sets of alignment holes (e.g., 125 and 135) in top elastic element 120 and outer cover 130.

Compact imaging module 100 may further comprise a bottom elastic element 170 between a bottom case 190 and lens holder 165. The bottom elastic element may include a set of alignment holes 175 to receive pins 195 protruding from bottom case 190. The bottom case may include one or more slots (e.g., 193 shown in FIG. 9) to receive a relatively large portion of an (e.g., L-shaped or T-shaped) electrically conductive connector 180 to electrically contact bottom elastic element 170. Of course, such details of imaging module 100 are merely examples, and claimed subject matter is not so limited.

Figure 2:
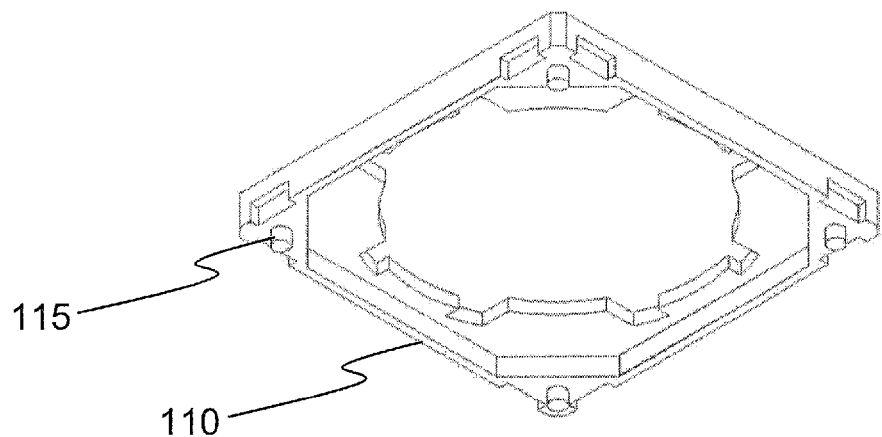
FIG. 2 is a perspective view of a top case of a compact imaging module, according to an embodiment.

FIG. 2 is a perspective view of top case 110 of compact imaging module 100, according to an embodiment. Top case 110 is shown upside-down in FIG. 2 relative to how it is shown in FIG. 1. Though claimed subject matter is not so limited, top case 110 may include pins 115 protruding from the top case. Such pins may be in corner regions of top case 110. As mentioned above, outer cover 130 may include a set of alignment holes 135 to receive pins 115.

Figure 3:
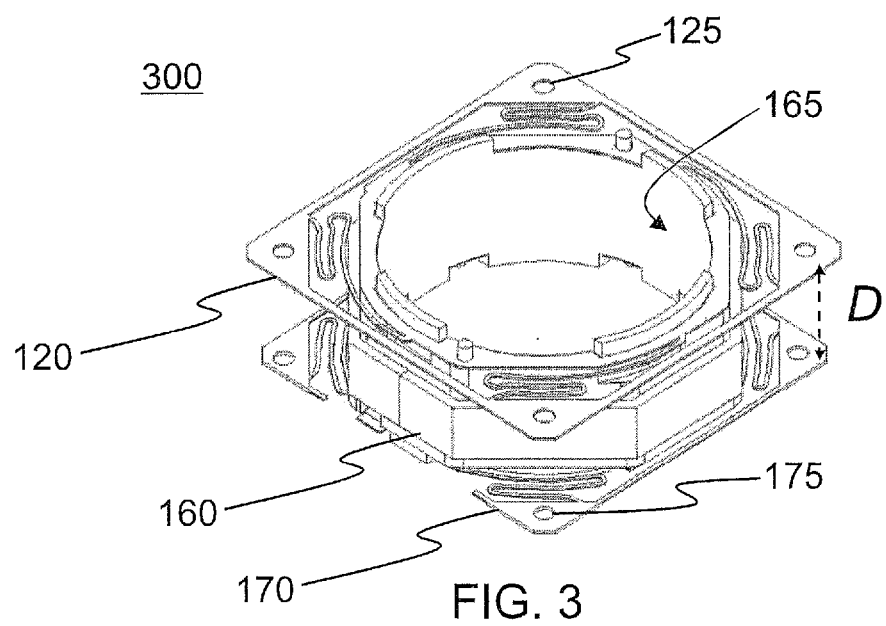
FIG. 3 is a perspective view of a lens holder and spring assembly of a compact imaging module, according to an embodiment.

FIG. 3 is a perspective view of a lens holder and spring assembly 300 of a compact imaging module, such as 100 shown in FIG. 1, according to an embodiment. For example, coil 160 may be around a circumference of lens holder 165. Such an assembly of the coil and lens holder may be between top elastic element 120 and bottom elastic element 170. As described in detail below, a portion of the top elastic element and a portion of the bottom elastic element may be attached to lens holder 165. As described above, top elastic element 120 and bottom elastic element 170 may include a set of holes 125 and 175, respectively. For example, holes 125 of top elastic element 120 may receive pins 115 protruding from top case 110 and holes 175 of bottom elastic element 170 may receive pins 195 protruding from bottom case 190. Top elastic element 120 and bottom elastic element 170 may be separated by a distance D, as described below. In a particular implementation, D may be greater than about 1.8 millimeters to allow for relatively high rotational stiffness of the spring system comprising top and bottom elastic elements 120 and 170. Such relatively high rotational stiffness may provide relatively stable motion of lens holder 165 during displacement by actuator 155 substantially along optical axis 102, for example.

Figure 4A:
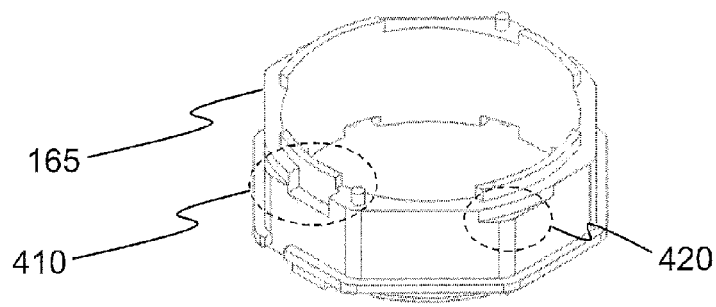
FIG. 4A is a perspective view of a lens holder of a compact imaging module, according to an embodiment.
Figure 4B:
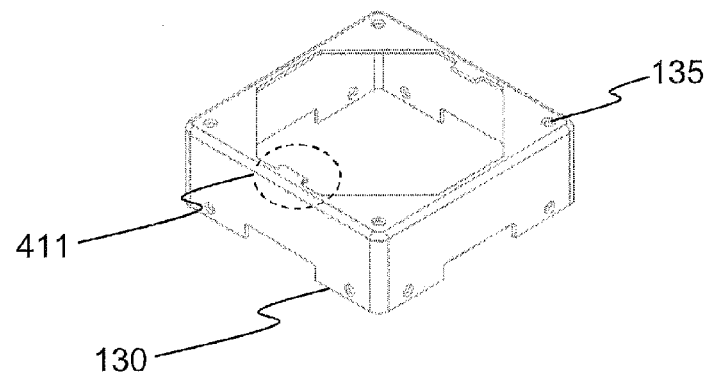
FIG. 4B is a perspective view of an outer cover of a compact imaging module, according to an embodiment.

FIG. 4A is a perspective view of lens holder 165 and FIG. 4B is a perspective view of outer cover 130 of compact imaging module 100, according to an embodiment. Lens holder 165 may include one or more buffer spaces 410, which may comprise notched portions of the lens holder, for example. Outer cover 130 may comprise one or more protrusions 411 directed substantially toward optical axis 102. Individual buffer spaces 410 may receive individual protrusions 411. For example, as lens holder 165 is placed inside outer cover 130, protrusions 411 may mate with corresponding buffer spaces 410 of the lens holder. Such a mated assembly of outer cover 130 and lens holder 165 may allow for a resistance of the lens holder to rotate about the optical axis within the outer cover. For example, torsional forces may impart rotational motion (e.g., lateral or twisting motions) on lens holder 165. Such a mated assembly of outer cover 130 and lens holder 165 may also allow for limiting lateral displacement of the lens holder perpendicular to the optical axis.

Figure 5:
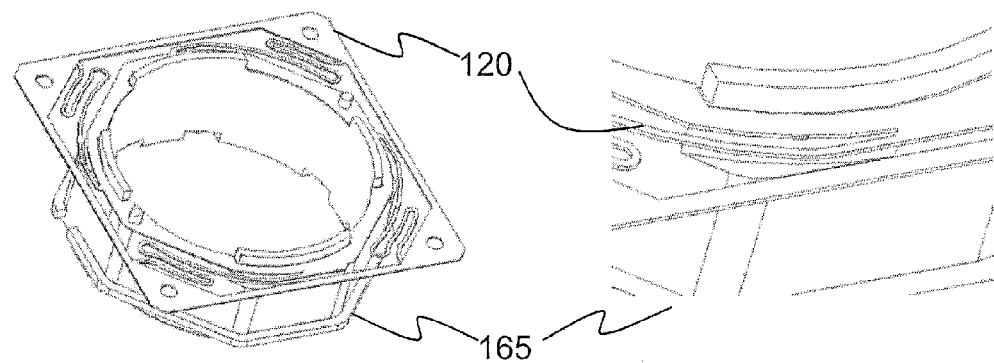
FIG. 5 shows an embodiment of an assembled top elastic element and a lens holder.

In an implementation, lens holder 165 may comprise a buffer area 420 to allow displacement of spring arms of the top elastic element 120 to avoid a collision between the spring arms and the lens holder if the lens holder moves. For example, FIG. 5 shows an embodiment of top elastic element 120 and lens holder 165 assembled so that lens holder 165 may comprise buffer area 420 to allow displacement of spring arms of the top elastic element 120 to prevent a collision between the spring arm and the lens holder as the lens holder moves. For example, as actuator 155 imparts a force on lens holder 165, the lens holder may be displaced along the optical axis. Such lens holder displacement may deform top and bottom elastic elements 120 and 170 as displacement of the lens holder increases along the optical axis. At a particular point of such displacement and deformation, a portion of top elastic element 120 may contact buffer area 420. Accordingly, contact buffer area 420 may prevent such a portion of top elastic element 120 from further displacement along the optical axis. Of course, such details of lens holder 165 and outer cover 130 are merely examples, and claimed subject matter is not so limited.

Figure 6:
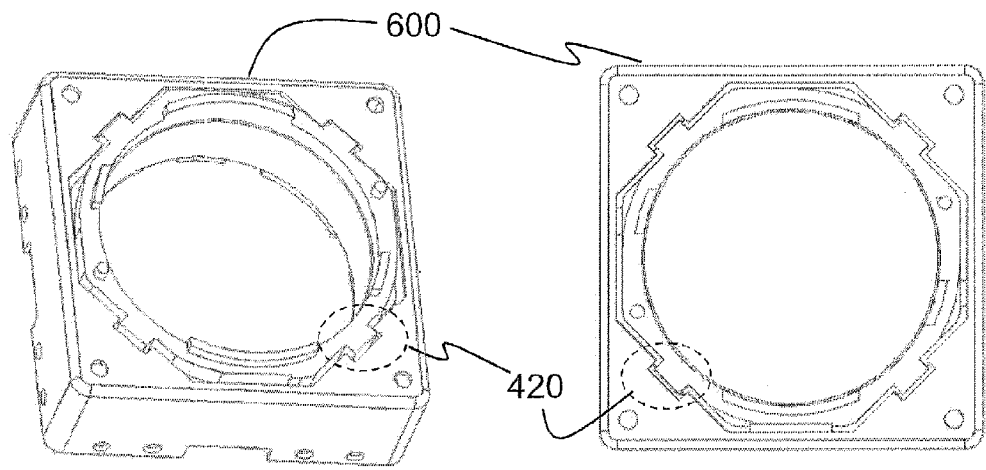
FIG. 6 shows a perspective and plan view of a lens holder 600, according to another embodiment.

FIG. 6 shows a perspective and plan view of a lens holder 600, according to another embodiment. Lens holder 600 may include one or more protrusions 611. Individual notched portions of an outer cover may receive individual protrusions 611. For example, as lens holder 600 is placed inside such an outer cover, protrusions 611 may mate with corresponding notched portions of the outer cover. Such a mated assembly of outer cover and lens holder may allow for a resistance of the lens holder to rotate about the optical axis within the outer cover. For example, torsional forces may impart rotational motion (e.g., lateral or twisting motions) on lens holder 600. Such a mated assembly of outer cover and lens holder may also allow for limiting displacement of the lens holder along the optical axis. Of course, such details of lens holder 600 are merely examples, and claimed subject matter is not so limited.

Figure 7:
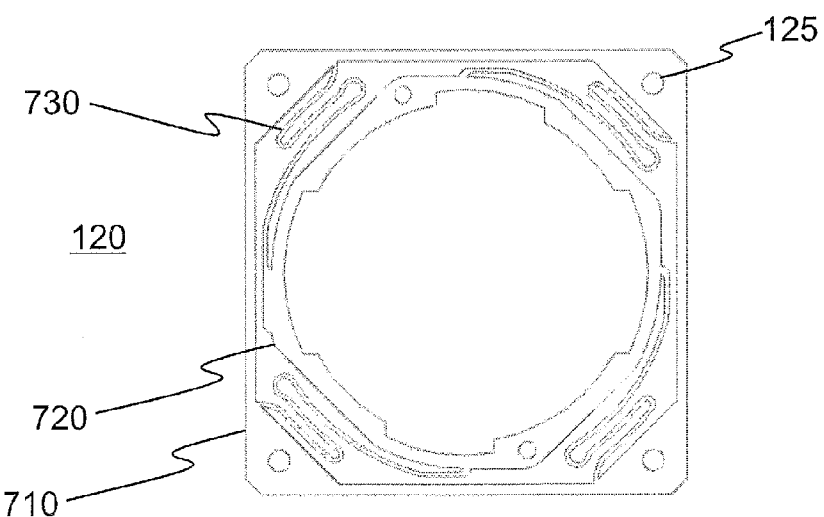
FIG. 7 is a perspective view of a top elastic element of a compact imaging module, according to an embodiment.

FIG. 7 is a perspective view of top elastic element 120 of compact imaging module 100, according to an embodiment. An outer portion 710 may be connected to an inner portion 720 via spring arms 730. As described above, inner portion 720 of top elastic element 120 may be attached to lens holder 165 and outer portion 610 of the top elastic element may be attached to outer cover 130. Also described above, top elastic element 120 may include a set of holes 125 to receive pins 115 of top case 110.

Figure 8A:
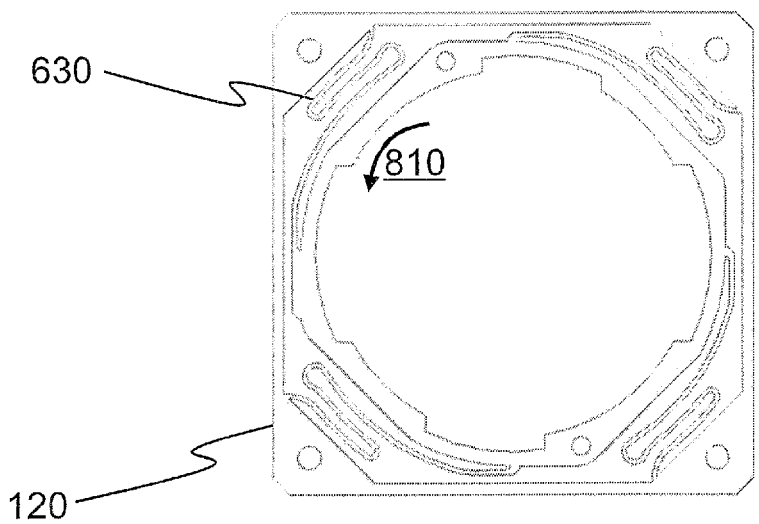
FIG. 8A is a perspective view of an elastic element having a counter-clockwise orientation, according to an embodiment.
Figure 8B:
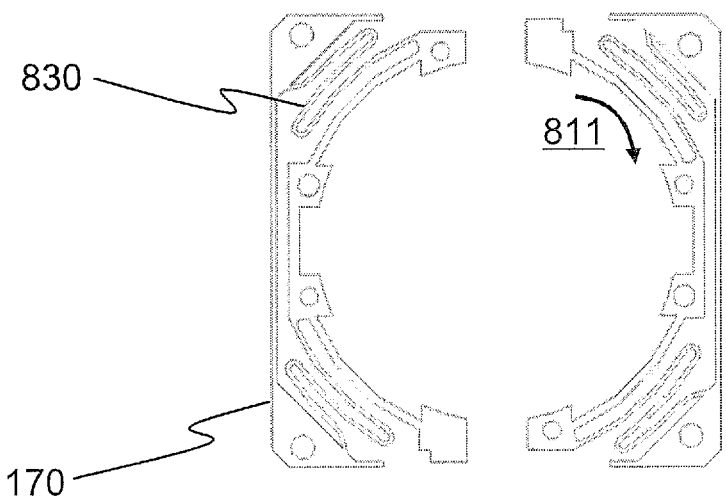
FIG. 8B is a perspective view of an elastic element having a clockwise orientation, according to an embodiment.
Figure 9A:
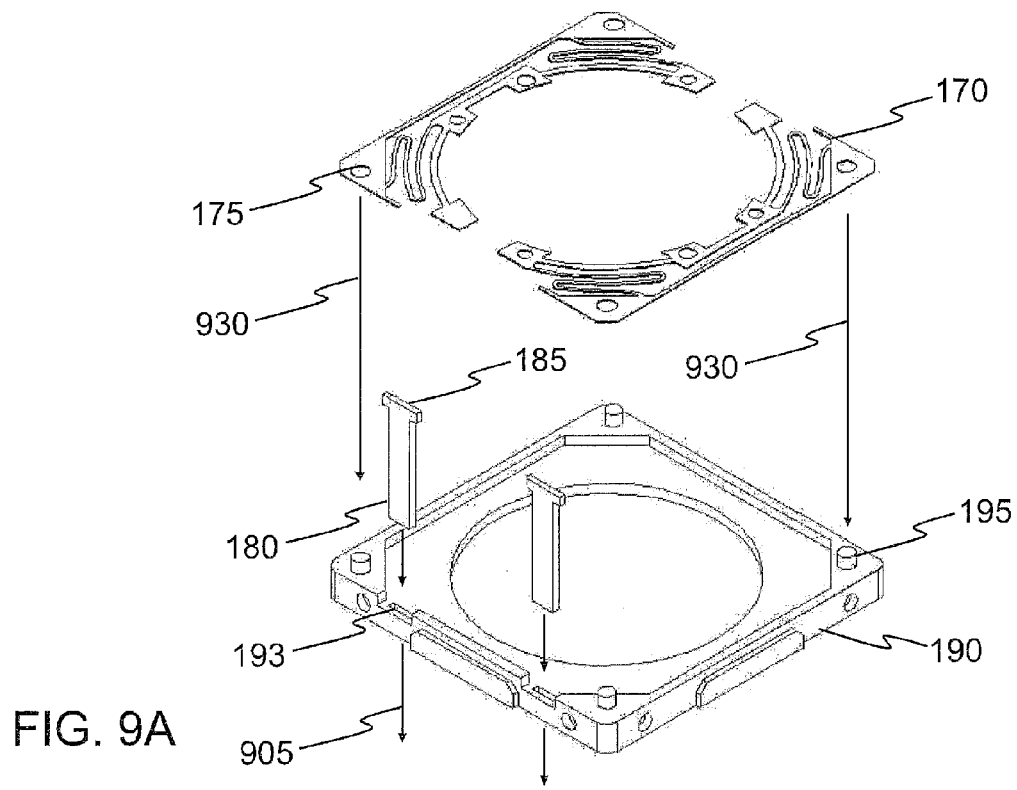
FIGS. 9A and 9B are perspective views of a bottom case, bottom elastic element, and T-shaped connectors of a compact imaging module, according to an embodiment.
Figure 9B:
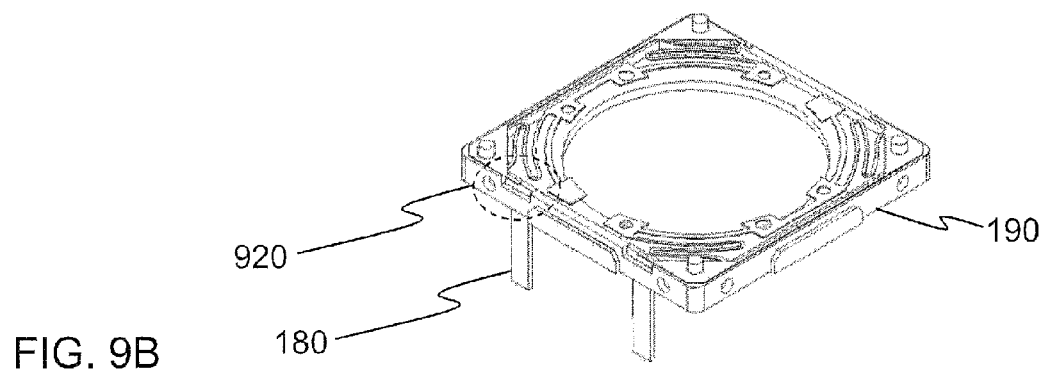

FIG. 8A is a perspective view of an elastic element, such as top elastic element 120 shown in FIGS. 1 and 6, for example. FIG. 8B is a perspective view of an elastic element, such as bottom elastic element 170 shown in FIG. 1. In an embodiment, top elastic element 120 and bottom elastic element 170 may be oriented in compact imaging module 100 oppositely relative to each other. Such orientation may be based, at least in part, on spring arm direction, as described below. For example, top elastic element 120 may have a counter-clockwise orientation, whereas bottom elastic element 170 may have a clockwise orientation. Here, orientation may be defined by a direction that spring arms 630 and 830 extend from an inner or outer portion of an elastic element. For example, in FIG. 8A, arrow 810 indicates that top elastic element 120 has a counter-clockwise orientation, whereas in FIG. 8B, arrow 811 indicates that bottom elastic element 170 has a clockwise orientation. Such an opposite orientation may allow for improved rotational stiffness of a spring system that includes the top and bottom elastic elements and lens holder 165, compared to a case where the elastic elements are oriented the same as each other. For example, rotational stiffness may allow for relatively stable motion of lens holder 165 during motion imparted by actuator 155. Thus, tilting angle, which may be an undesirable feature of mechanical tolerances, of lens holder 165 within compact imaging module 100 may be relatively small. Such orientation of top and bottom elastic elements is relative in that, for example, top elastic element 120 may have a clockwise orientation, whereas bottom elastic element 170 may have a counter-clockwise orientation. FIGS. 9A and 9B are perspective views of bottom case 190, bottom elastic element 170, and T-shaped connectors 180 of compact imaging module 100, according to an embodiment. Bottom case 190 may include one or more openings 193, such as slots, for example, to receive T-shaped connectors 180, as indicated by arrows 905. In one implementation, T-shaped connectors 180 may include a relatively wide portion 185 that is too wide to slip through openings 193. Accordingly, T-shaped connectors 180 may be "seated" in openings 193 so that relative wide portion 185 of the T-shaped connectors 180 rest against a portion of bottom case 190 in a region 920, for example. T-shaped connectors 180 may comprise an electrically conductive material (e.g., metal) to conduct electrical signals to or from actuator 155 via bottom elastic element 170, for example. Such T-shaped connectors 180 may provide a number of benefits. For example, epoxy or other adhesive need not be used to physically secure electrical conductors: A combination of bottom case 190 and bottom elastic element 170 may securely hold T-shaped connectors 180 in place. As an example of another benefit, wide portion 185 of the T-shaped connectors 180 may provide a relatively large contact surface area between bottom case 190 and bottom elastic element 170 to allow for relatively low electrical resistance.

As described above, bottom elastic element 170 may include holes 175 to receive pins 195 that protrude from bottom case 190. Such a hole-pin system may allow for alignment between bottom elastic element 170 and bottom case 190, as indicated by arrows 930, for example. Of course, such details of bottom case 190 and bottom elastic element 170 are merely examples, and claimed subject matter is not so limited.

Figure 10A:
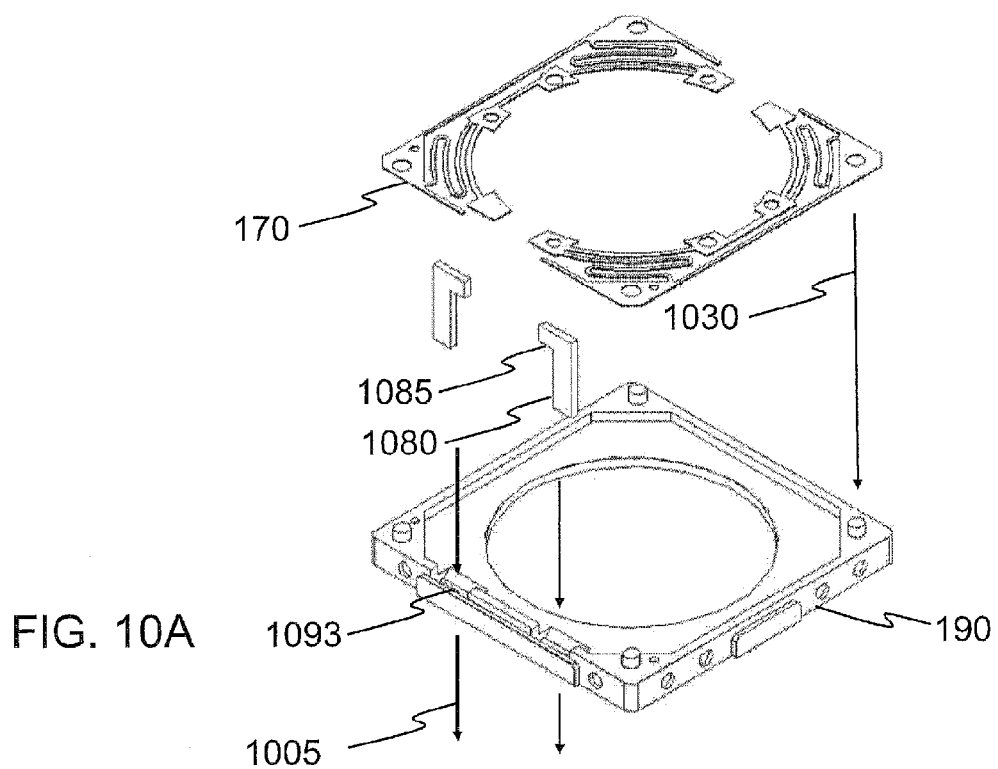
FIGS. 10A and 10B are perspective views of a bottom case, bottom elastic element, and L-shaped connectors of a compact imaging module, according to an embodiment.
Figure 10B:
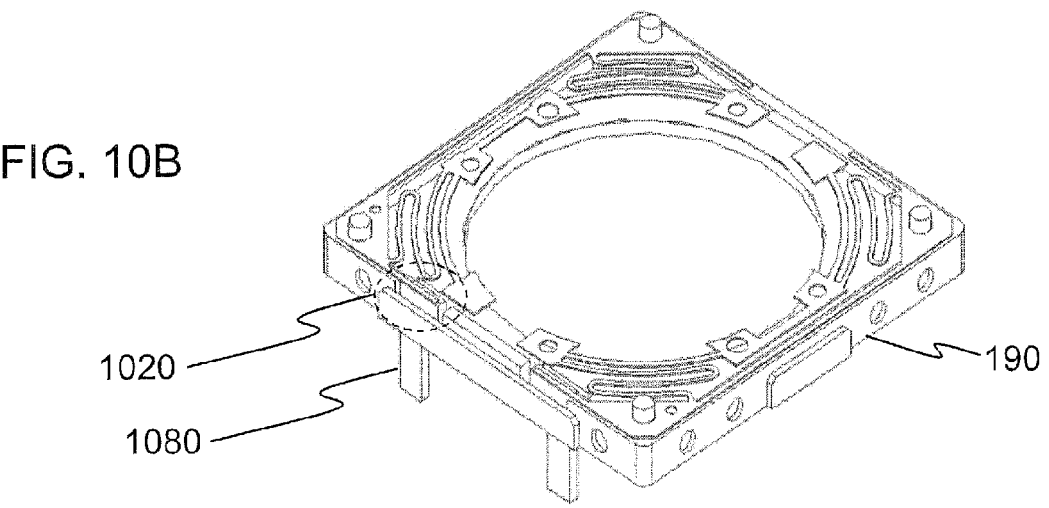

FIGS. 10A and 10B are perspective views of bottom case 190, bottom elastic element 170, and L-shaped connectors 1080 of compact imaging module 100, according to another embodiment. Bottom case 190 may include one or more openings 1093, such as slots, for example, to receive L-shaped connectors 1080, as indicated by arrows 1005. In one implementation, L-shaped connectors 1080 may include a relatively wide portion 1085 that is too wide to slip through openings 1093. Accordingly, L-shaped connectors 1080 may be "seated" in openings 1093 so that relatively wide portion 1085 of the L-shaped connectors 1080 rest against a portion of bottom case 190 in a region 1020, for example. L-shaped connectors 1080 may comprise an electrically conductive material (e.g., metal) to conduct electrical signals to or from actuator 155 via bottom elastic element 170, for example. As described above for T-shaped connectors, such L-shaped connectors 1080 may provide a number of benefits. For example, epoxy or other adhesive need not be used to physically secure electrical conductors: A combination of bottom case 190 and bottom elastic element 170 may securely hold L-shaped connectors 1080 in place. As an example of another benefit, wide portion 1085 of the L-shaped connectors 1080 may provide a relatively large contact surface area between bottom case 190 and bottom elastic element 170 to allow for relatively low electrical resistance.

As described above, bottom elastic element 170 may include holes 175 to receive pins 195 that protrude from bottom case 190. Such a hole-pin system may allow for alignment between bottom elastic element 170 and bottom case 190, as indicated by arrows 1030, for example. Of course, such details of bottom case 190 and bottom elastic element 170 are merely examples, and claimed subject matter is not so limited.

Figure 11:
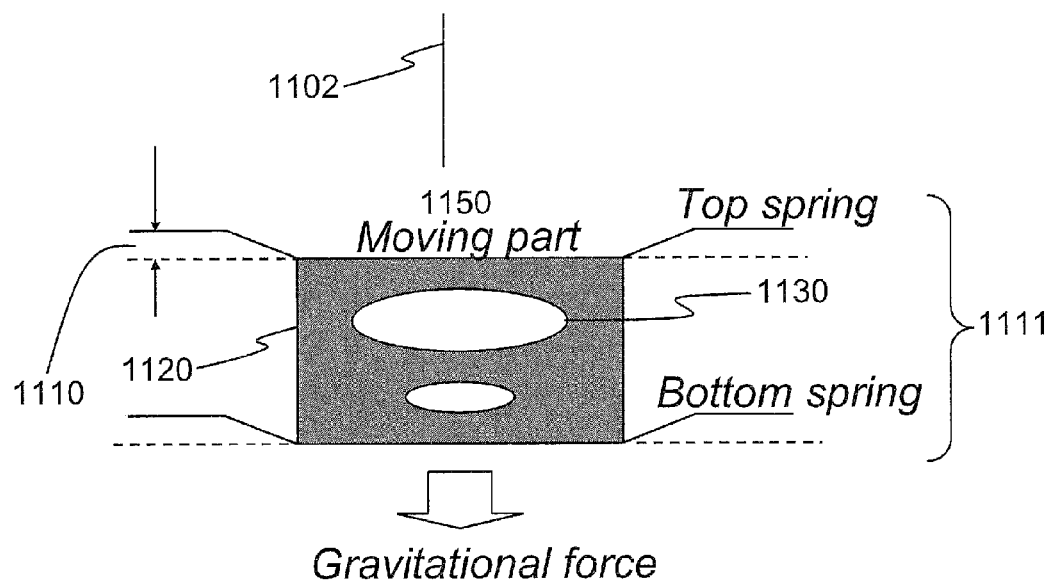
FIG. 11 is a schematic diagram of a lens assembly and an elastic element assembly of a compact imaging module, according to an embodiment.

FIG. 11 is a schematic diagram of a lens assembly 1120 and an elastic element assembly 1111 of a compact imaging module, such as 100 shown in FIG. 1, for example, according to an embodiment. For example, FIG. 3 shows an embodiment of lens holder 165 and spring assembly 300, which may be similar to lens assembly 1120 and elastic element assembly 1111. Moving part 1150 may comprise an assembly of a coil, lens holder, and one or more lenses 1130. An actuator, such as 155, may impart an electromagnetic force to displace moving part 1150 along an optical axis 1102. In addition to such intentional displacement by an actuator, moving part 1150 may be displaced by gravity acting on moving part 1150. In other words, the weight of moving part 1150 may deform top and bottom elastic elements (e.g., 120 and 170) and displace moving part 1150 by an undesirable displacement 1110. Thus, in a particular implementation, as mentioned above, a combination of top and bottom elastic elements may be configured to physically support a weight W of moving parts such as a coil, lens, and a lens holder, wherein such a combination has a spring constant k to satisfy the relationship k×1.0 mm>=20.0×W (In other words, the k-constant multiplied by 1.0 millimeters is equal to or greater than 20.0 times a weight of loading). Here, k has units of gram-force per millimeter, and W has units of gram-force. In another particular implementation, top and bottom elastic elements may be separated by a distance greater than or equal to about 1.8 millimeters.

Figure 12:
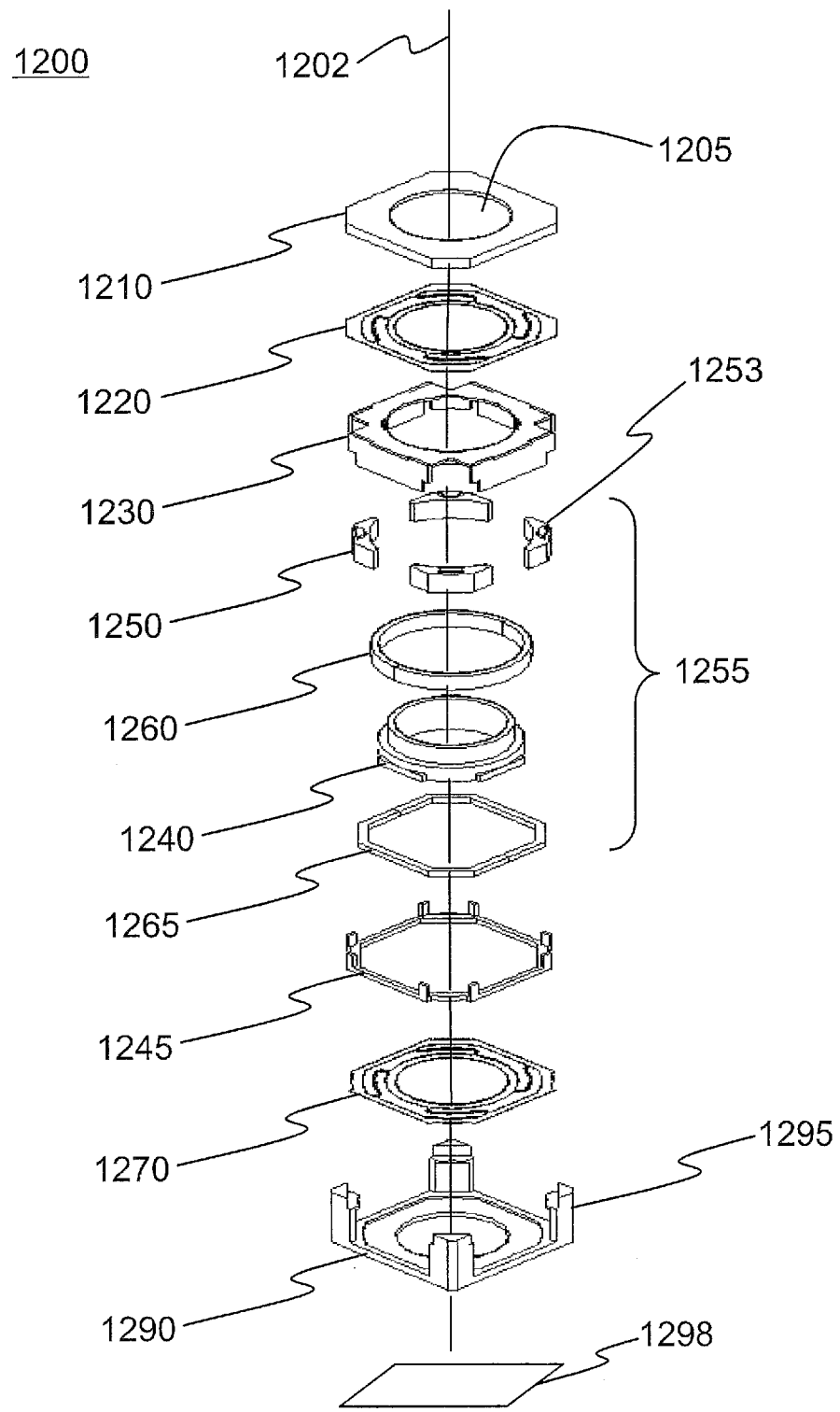
FIG. 12 is an exploded perspective view of a compact imaging module, according to another embodiment.

Of course, such details of a lens assembly are merely examples, and claimed subject matter is not so limited. FIG. 12 is an exploded perspective view of a compact imaging module 1200, according to an embodiment. Such an imaging module may comprise an image sensor 1298 including an active region of an array of pixilated charge-coupled devices (CCD) or one or more complementary metal-oxide-semiconductor (CMOS) devices, just to name a couple of examples. Imaging module 1200 may further comprise a lens holder 1240 to hold one or more lenses (not shown) and an actuator 1255 to adjust a position of the lens holder along an optical axis 1202. For example, such lenses may project an image onto an active region of image sensor 1298. Aperture 1205 may receive light into lens holder 1240. Such an image need not comprise visible wavelengths, but may also comprise infrared and/or ultraviolet wavelengths, for example. So that such an image may be focused onto an active region of image sensor 1298, actuator 1255 may adjust a position of a lens assembly with respect to image sensor 1298. In a particular implementation, actuator 1255 may adjust a vertical position of lens holder 1240 with respect to image sensor 1298. Actuator 1255 may include magnets 1250 and a first coil 1260 and a second coil 1265 to produce an electromagnetic force. Magnets 1250 may include protrusions 1253, as discussed below. The compact imaging module may further comprise a top elastic element 1220 between a top case 1210 and the segmented outer cover 1230. In a particular implementation, the top elastic element may comprise a first portion that is movable with respect to the at least one coil, and a second portion that is fixed with respect to said at least one coil. The first portion of the top elastic element may be attached to lens holder 1240, whereas the second portion of the top elastic element maybe attached to the top case 1210 and sandwiched between the top case and the segmented outer cover. Of course, such details of a compact imaging module are merely examples, and claimed subject matter is not so limited. Compact imaging module 1200 may further comprise a bottom elastic element 1270 between a bottom case 1290 and a bottom spacer 1245. The bottom case may include one or more posts 1295, as explained below. Of course, such details of imaging module 1200 are merely examples, and claimed subject matter is not so limited.

Figure 13:
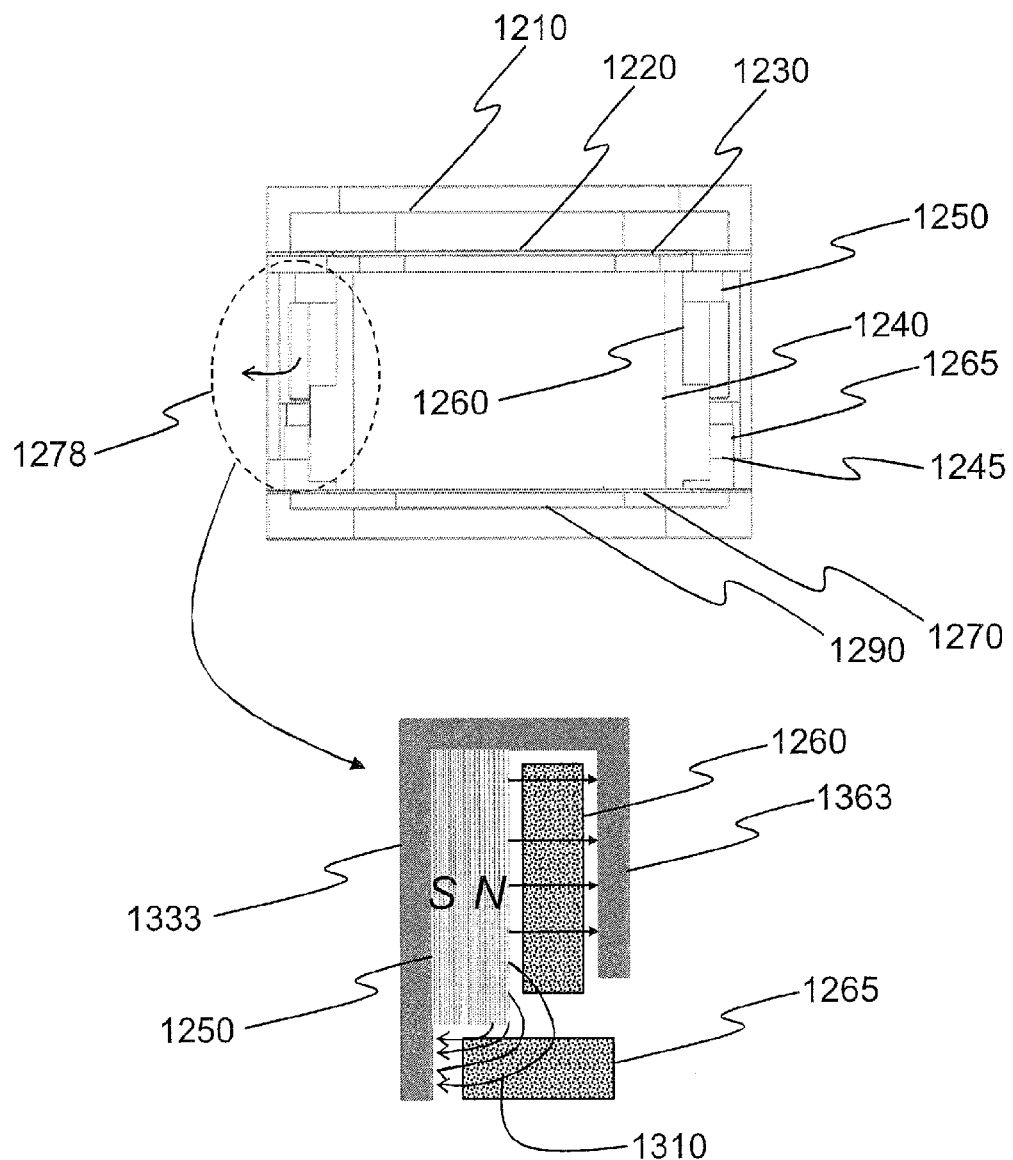
FIG. 13 is a cross-section view of components that comprise a compact imaging module, according to another embodiment.

FIG. 13 is a cross-section view of components that comprise compact imaging module 1200, according to an embodiment. Lens holder 1240 may occupy an interior portion formed by magnets 1250, first coil 1260, and second coil 1265 to produce an electromagnetic force. Top elastic element 1220 may be between top case 1210 and segmented outer cover 1230. Bottom elastic element 1270 may be between bottom case 1290 and bottom spacer 1245.

According to an embodiment, a portion 1278 of compact imaging module 1200 is shown in detail in FIG. 13. Segmented outer cover may comprise outer cover portion 1333 and outer cover portion 1363. Such a segmented outer cover and portions thereof may comprise a magnetically permeable material, which may generate or form a particular magnetic field by virtue of magnets 1250, for example. Accordingly, outer cover portions may at least partially direct a magnetic field 1310 across first and second coils 1260 and 1265. Such a configuration may allow for an increase (e.g., such as around 26%) in magnetic field strength for actuator 1255 compared to a configuration that does not include such an arrangement of outer cover portions and first and second coils, for example. In one implementation, such a first coil and a second coil may interact with a same particular magnet among the one or more magnets 1250.

Figure 14:
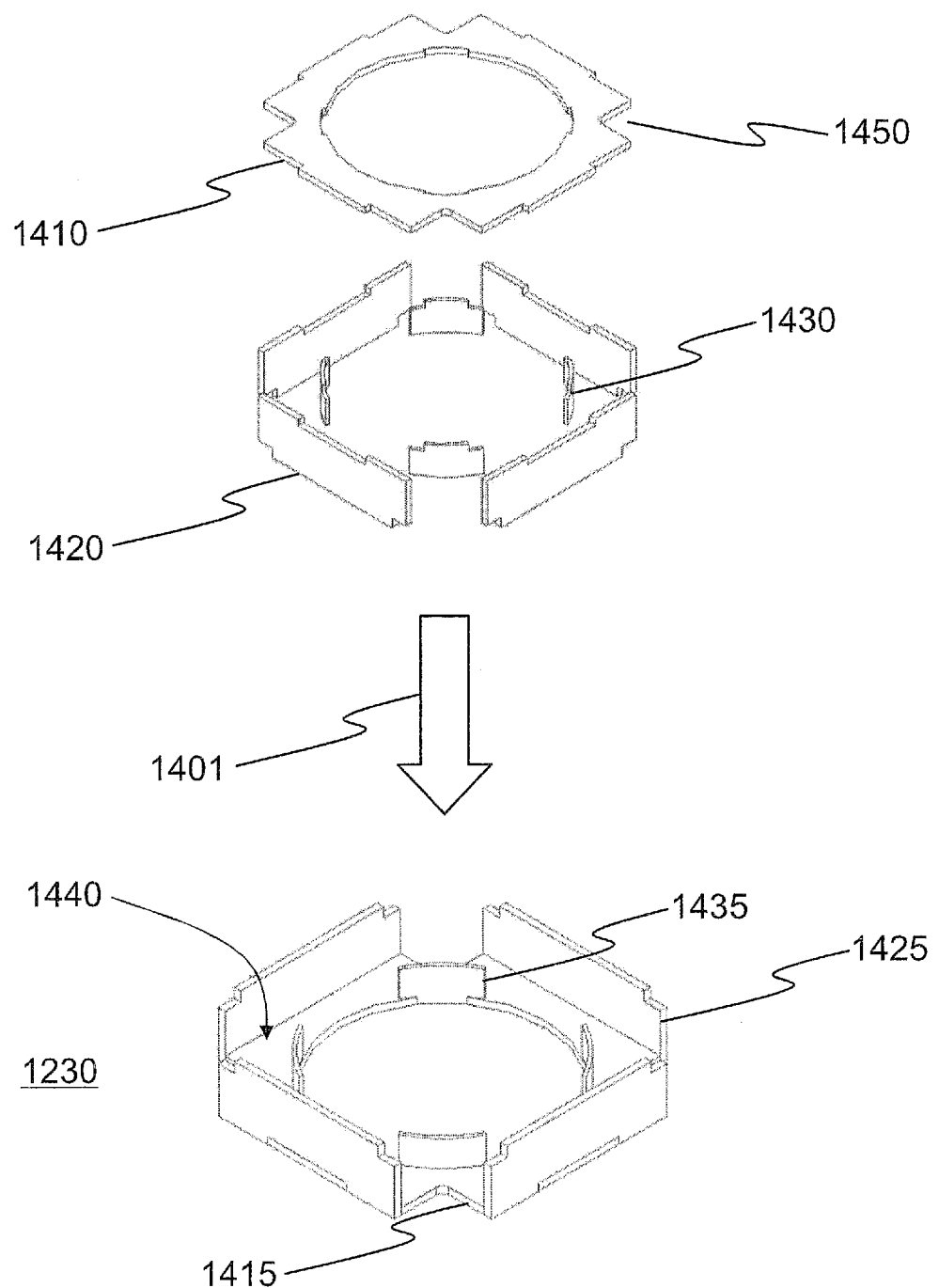
FIG. 14 is a perspective view of a segmented outer cover of a compact imaging module, according to an embodiment.

FIG. 14 is a perspective view of segmented outer cover 1230 of compact imaging module 1200, according to an embodiment. For example, segmented outer cover 1230 may comprise an assembly of a two-dimensional outer cover base 1410, two-dimensional outer cover arms 1420, and two-dimensional outer cover teeth 1430. Outer cover base 1410 may include notched corners 1450 to allow for viewing windows in an assembled outer cover structure, as described below. Such two-dimensional components may be substantially flat, which may be produced from stamped sheet material, though claimed subject matter is not limited in this respect. As shown by arrow 1401, such two-dimensional components may be assembled together to form segmented outer cover 1230, for example. Accordingly, segmented outer cover 1230 may comprise assembled outer cover base 1415, assembled outer cover arms 1425, and assembled outer cover teeth 1435. A space 1440 between assembled outer cover arms 1425 and assembled outer cover teeth 1435 may receive magnets, such as 1250, of an actuator, for example. In an implementation, assembled outer cover teeth 1435 may comprise inner outer cover portion 1363 while assembled outer cover arms 1425 may comprise outer cover portion 1333, shown in FIG. 13, for example. Assembling an outer cover from two-dimensional parts, as described above, may provide a number of benefits. For example, such a process may use various thicknesses, shapes, or material of outer cover parts. Such a process may allow for relatively high precision of assembly of an outer cover. Such a process may allow for use of stamped parts having a relatively low manufacturing cost. Such a process may allow for relatively inexpensive design flexibility by an ability to use any of a large number of materials, thickness, and so on. Of course, such details of segmented outer cover 1230 are merely examples, and claimed subject matter is not so limited.

Figure 15:
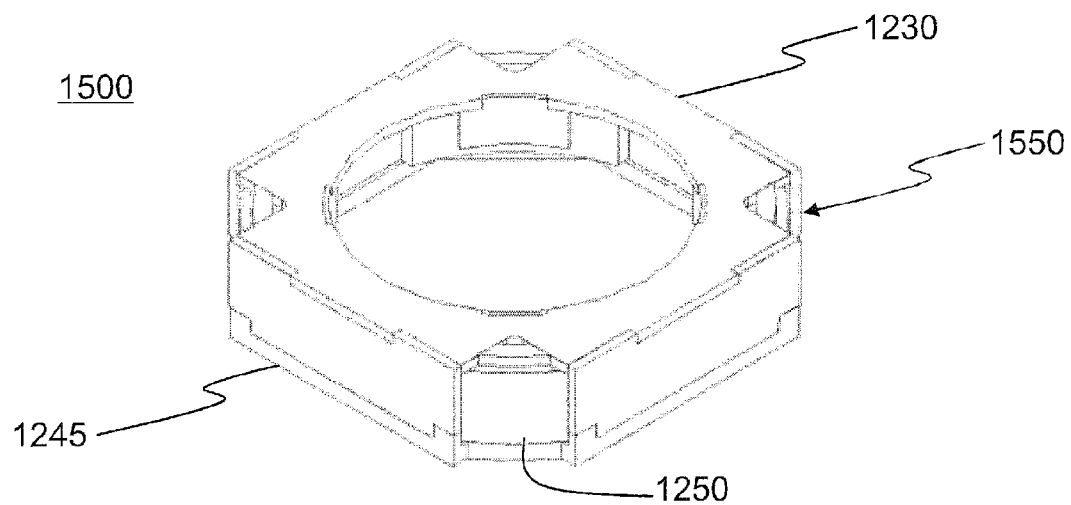
FIGS. 15-17 are perspective views of a segmented outer cover and magnets of a compact imaging module, according to an embodiment.

FIG. 15 is a perspective view of a portion 1500 of compact imaging module 1200, according to an embodiment. For example, portion 1500 may include segmented outer cover 1230, magnets 1250, and bottom spacer 1245. Portion 1500 may include notched regions 1550 to receive an adhesive and to provide viewing windows for observing alignment of magnets 1250 in segmented outer cover 1230. For example, such viewing windows may provide an ability to inspect alignment of the magnets at any time after assembly of portion 1500. Such notched regions 1550 may receive corresponding posts 1295 of bottom case 1290 to allow for alignment between portion 1500 and bottom case 1290, as described below.

Figure 16:
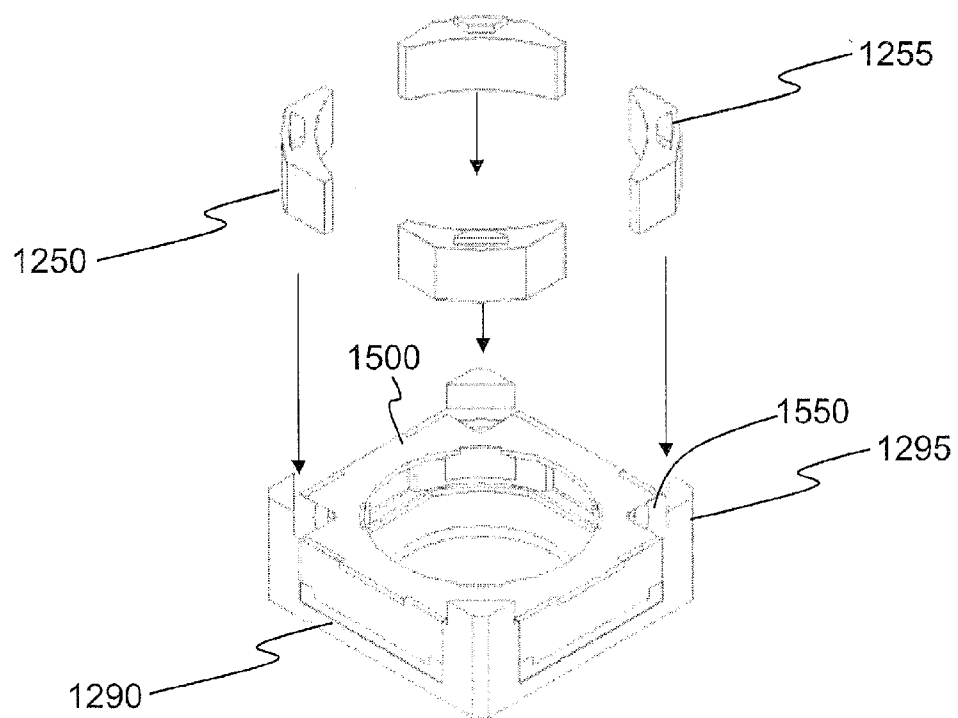
Figure 17:
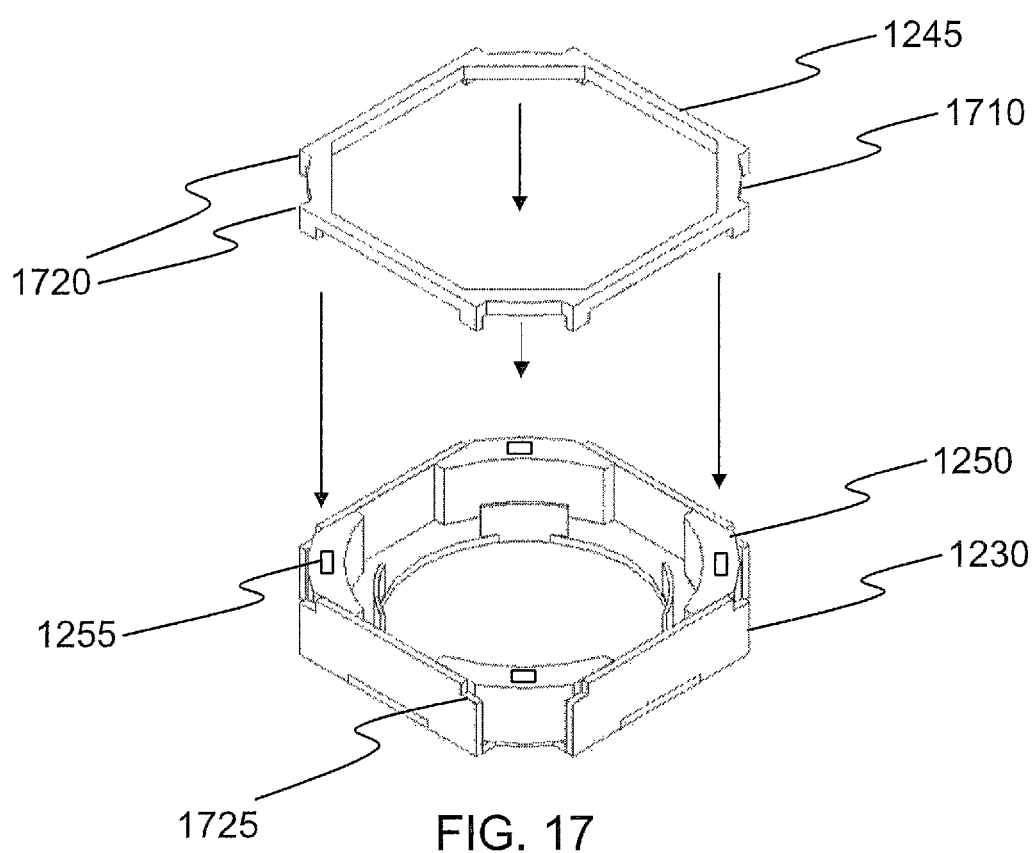

FIGS. 16-17 are perspective views of portion 1500 of compact imaging module assembled with bottom case 1290, according to an embodiment. As mentioned above, notched regions 1550 may mate with corresponding posts 1295 of bottom case 1290 to allow for alignment between portion 1500 and bottom case 1290. Magnets 1250, which may have a shape that corresponds to notched regions 1550, may be included in portion 1500. Magnets 1250 may include a protrusion 1255 that corresponds to indents 1710 of bottom spacer 1245 to assist in aligning such components during assembly. Bottom spacer 1245 may also include protrusions 1720 that correspond to notches 1725 of segmented outer cover 1230 to further assist in aligning such components during assembly. Of course, such details of portion 1500 of a compact imaging module are merely examples, and claimed subject matter is not so limited.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A lens driving apparatus comprising:
   a lens holder to hold one or more lenses;
   magnets and at least one coil to produce an electromagnetic force;
   an outer cover comprising a top portion including a first set of alignment holes to receive pins protruding from a top case;
   a top elastic element between said top case and said outer cover, said top elastic element including a second set of alignment holes to receive said pins;
   an adhesive isolator between said top portion of said outer cover and said magnets, said adhesive isolator including notched regions to receive an adhesive to adhere said top elastic element and said outer cover to said pins; and
   wherein said lens holder comprises a buffer area to allow displacement of spring arms of said to elastic element to prevent collision between said spring arms and said lens holder during movement of said lens holder.

2. The lens driving apparatus of claim 1, wherein said outer cover comprises a protrusion directed substantially toward said optical axis, wherein said protrusion mates with a notched portion of said lens holder to resist rotation of said lens holder about said optical axis or to resist lateral motion perpendicular to said optical axis.

3. The lens driving apparatus of claim 1, wherein said lens holder comprises one or more protrusions corresponding to and to mate with a notched portion of said outer cover.

4. The lens driving apparatus of claim 1, further comprising:
   a bottom elastic element between a bottom case and said lens holder, said bottom elastic element including a third set of alignment holes to receive pins protruding from said bottom case.

5. The lens driving apparatus of claim 4, wherein spring arms of said top elastic element are positioned clockwise and spring arms of said bottom elastic element are positioned counter-clockwise.

6. The lens driving apparatus of claim 4, wherein spring arms of said top elastic element are positioned counter-clockwise and spring arms of said bottom elastic element are positioned clockwise.

7. The lens driving apparatus of claim 4, wherein a combination of said top and bottom elastic elements are configured to physically support a weight W of moving parts comprising said at least one coil, one or more lenses, and said lens holder, wherein said combination has a spring constant k to satisfy the relationship $$k \times 1.0 \text{ mm} >= 20.0 \times W.$$

8. The lens driving apparatus of claim 4, wherein said top and bottom elastic elements are separated by a distance greater than or equal to about 1.8 millimeters.

9. The lens driving apparatus of claim 4, further comprising an electrically conductive L-shaped or T-shaped connector comprising a top large portion and a bottom smaller portion.

10. The lens driving apparatus of claim 4, wherein said bottom case includes one or more slots to receive said bottom smaller portion of electrically conductive connector and said top large portion of electrically conductive connector electrically contacts said bottom elastic element.

11. The lens driving apparatus of claim 1, wherein said top elastic element comprises a first portion that is movable with said at least one coil, and a second portion that is fixed to a non-moving structure.

12. The lens driving apparatus of claim 11, wherein said first portion of said top elastic element is attached to said lens holder.

13. The lens driving apparatus of claim 11, wherein said second portion of said top elastic element is attached to said top case and sandwiched between said top case and said outer cover.

14. A lens driving apparatus comprising:
   a lens holder to hold one or more lenses;
   at least one magnet and at least one coil to produce an electromagnetic force;
   a segmented outer cover including notched regions to receive an adhesive and to provide viewing windows for observing alignment of said magnets in said segmented outer cover;
   a top elastic element arranged between a top case and said segmented outer cover; and
   a bottom elastic element arranged between a bottom case and said lens holder;
   wherein a combination of said top and bottom elastic elements are configured to physically support a weight W of moving parts comprising said at least one coil, one or more lenses, and said lens holder, wherein said combination has a spring constant k to satisfy the relationship:
   $k \times 1.0 \text{ mm} >= 20.0 \times W$.

15. The lens driving apparatus of claim 14, wherein said segmented outer cover comprises an assembly of a two-dimensional outer cover base, two-dimensional outer cover arms, and two-dimensional outer cover teeth, wherein a space between said two-dimensional outer cover arms and said two-dimensional outer cover teeth receive said magnets.

16. The lens driving apparatus of claim 14, further comprising:
   an outer cover including upward extending arms to be received by said notched regions of said segmented outer cover.

17. The lens driving apparatus of claim 14, wherein said one or more coils comprises a first coil and a second coil that interact with a same particular magnet among said one or more magnets.

18. The lens driving apparatus of claim 14, wherein individual said magnets include a protrusion to align said one or more coils in a particular orientation with respect to said segmented outer cover.

* * * * *